US012157367B1

United States Patent
Song et al.

(10) Patent No.: US 12,157,367 B1
(45) Date of Patent: Dec. 3, 2024

(54) ADJUSTABLE PEDAL SYSTEM

(71) Applicant: GM GLOBAL TECHNOLOGY OPERATIONS LLC, Detroit, MI (US)

(72) Inventors: Eunchan Song, Incheon (KR); Jeongmo Yang, Incheon (KR); Seongsu Kim, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/340,234

(22) Filed: Jun. 23, 2023

(51) Int. Cl.
| | |
|---|---|
| *B60K 26/02* | (2006.01) |
| *B60T 7/06* | (2006.01) |
| *G05G 1/01* | (2008.04) |
| *G05G 1/30* | (2008.04) |
| *G05G 1/36* | (2008.04) |
| *G05G 1/405* | (2008.04) |
| *G05G 1/46* | (2008.04) |

(52) U.S. Cl.
CPC ............... *B60K 26/02* (2013.01); *B60T 7/06* (2013.01); *G05G 1/01* (2013.01); *G05G 1/36* (2013.01); *G05G 1/405* (2013.01); *B60K 2026/026* (2013.01); *G05G 1/46* (2013.01)

(58) Field of Classification Search
CPC .. G05G 1/01; G05G 1/30; G05G 1/36; G05G 1/40; G05G 1/405; G05G 1/46; G05G 1/50; B60T 7/04; B60T 7/06; B60K 26/02; B60K 2026/026
See application file for complete search history.

(56) References Cited

U.S. PATENT DOCUMENTS

| | | | | |
|---|---|---|---|---|
| 1,425,413 | A * | 8/1922 | Page ................. | G05G 1/40 |
| | | | | 403/162 |
| 4,546,667 | A * | 10/1985 | Bopst, III .......... | G05G 5/18 |
| | | | | 74/513 |
| 6,367,349 | B1 * | 4/2002 | Allen .................. | G05G 1/405 |
| | | | | 74/512 |

(Continued)

FOREIGN PATENT DOCUMENTS

| | | | | |
|---|---|---|---|---|
| CN | 110001396 A | * | 7/2019 | ............ B60K 26/02 |
| DE | 102019215491 A1 | * | 12/2020 | |
| JP | 61011836 A | * | 1/1986 | |

(Continued)

OTHER PUBLICATIONS

Machine translation of DE 102019215491 A1 obtained on May 10, 2024.*

(Continued)

*Primary Examiner* — Adam D Rogers

(57) ABSTRACT

An adjustable pedal system for a vehicle includes an adjustable brake pedal assembly including a dual lever having an upper pivot mount portion and a pair of laterally spaced lower pedal mount portions, a pedal arm adapted to be selectively mounted to either of the pair of laterally spaced lower pedal mount portions, a foot pedal mounted at an end of the pedal arm. An adjustable accelerator pedal assembly including an upper lever arm having an upper pivot mount portion, an intermediate link having an upper end pivotally mounted to the upper lever arm by a first pivot joint and a pedal arm having an upper end mounted to a lower end of the intermediate link by a second pivot joint and including a foot pedal at a distal end.

19 Claims, 2 Drawing Sheets

(56) References Cited

U.S. PATENT DOCUMENTS

| | | | | |
|---|---|---|---|---|
| 10,358,031 B2* | 7/2019 | Hoshino | ................... | G05G 1/30 |
| 11,597,359 B1* | 3/2023 | Kim | ....................... | B60T 7/065 |

FOREIGN PATENT DOCUMENTS

| | | | | |
|---|---|---|---|---|
| KR | 19980023757 U | * | 7/1998 | |
| KR | 19980028437 U | * | 8/1998 | |
| KR | 19980030717 U | * | 8/1998 | |
| KR | 19980047386 U | * | 9/1998 | |
| KR | 20180082073 A | * | 7/2018 | |

OTHER PUBLICATIONS

Machine translation of KR 19980023757 U obtained on May 15, 2024.*

Machine translation of KR 19980030717 U obtained on May 15, 2024.*

\* cited by examiner

ADJUSTABLE PEDAL SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to an adjustable pedal system for a vehicle.

Currently, the problem of a disabled person with an injured or impaired right leg to drive with the left leg is solved by an adjustable pedal system to increase mobility. The existing methods allow driving with the left foot by changing only the position of the accelerator pedal by additional devices which provide an auxiliary accelerator pedal on the left of the brake pedal. However, there is a problem in the order of accelerator and brake pedal is changed and there is an inconvenience of installing additional devices. The present disclosure can provide convenient driving with left foot without pedal order changing by moving the position of the brake and acceleration pedals. The purpose of the present disclosure is to allow a disabled person with an injured or impaired right leg to drive with the left leg and operate a vehicle conveniently for their mobility by moving the position of the pedal of the vehicle without any special device.

SUMMARY

The problem of a disabled person with an injured or impaired right leg to drive with the left leg is solved by an adjustable pedal system to increase mobility. The purpose of the present disclosure is to allow a disabled person with an injured or impaired right leg to drive with the left leg and operate a vehicle conveniently for their mobility by moving the position of the pedal of the vehicle without any special device.

According to an aspect of the present disclosure, an adjustable brake pedal assembly includes a dual lever having an upper pivot mount portion and a pair of laterally spaced lower pedal mount portions. A pedal arm is adapted to be selectively mounted to either of the pair of laterally spaced lower pedal mount portions and a foot pedal mounted at an end of the pedal arm.

According to a further aspect, the pedal arm is mounted to either of the pair of laterally spaced lower pedal mount portions by a threaded fastener.

According to a further aspect, the pair of laterally spaced lower pedal mounts are equally spaced from an axis of rotation of the upper pivot mount.

According to a further aspect, the dual lever and the pedal arm are made from metal.

According to another aspect, an adjustable accelerator pedal assembly includes an upper lever arm having an upper pivot mount portion. An intermediate link includes an upper end pivotally mounted to the upper lever arm by a first pivot joint. A pedal arm includes an upper end mounted to a lower end of the intermediate link by a second pivot joint and includes a foot pedal at a distal end.

According to a further aspect, a first gear segment is mounted to the upper lever arm.

According to a further aspect, the intermediate link includes an upper gear segment in meshing engagement with the first gear segment and a lower gear segment.

According to a further aspect, a second gear segment is mounted to the pedal arm and engaged with the lower gear segment of the intermediate link.

According to a further aspect, the upper gear segment is rotatable about the first pivot joint.

According to a further aspect, the second gear segment is rotatable about the second pivot joint.

According to a further aspect, the first pivot joint is parallel to the second pivot joint.

According to a further aspect, a lateral position of the foot pedal is adjustable relative to the upper lever arm by pivoting of the first pivot joint and the second pivot joint.

According to another aspect, an adjustable pedal system for a vehicle, includes an adjustable brake pedal assembly including a dual lever having an upper pivot mount portion and a pair of laterally spaced lower pedal mount portions, a pedal arm adapted to be selectively mounted to either of the pair of laterally spaced lower pedal mount portions and a foot pedal mounted at an end of the pedal arm. An adjustable accelerator pedal assembly includes an upper lever arm having an upper pivot mount portion, an intermediate link having an upper end pivotally mounted to the upper lever arm by a first pivot joint and a pedal arm having an upper end mounted to a lower end of the intermediate link by a second pivot joint and including a foot pedal at a distal end.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
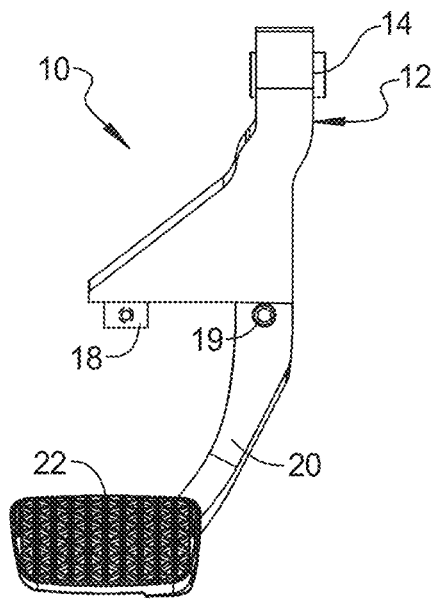
FIG. 1 is a perspective view of a two level brake pedal assembly with the brake pedal in a first position.
Figure 2:
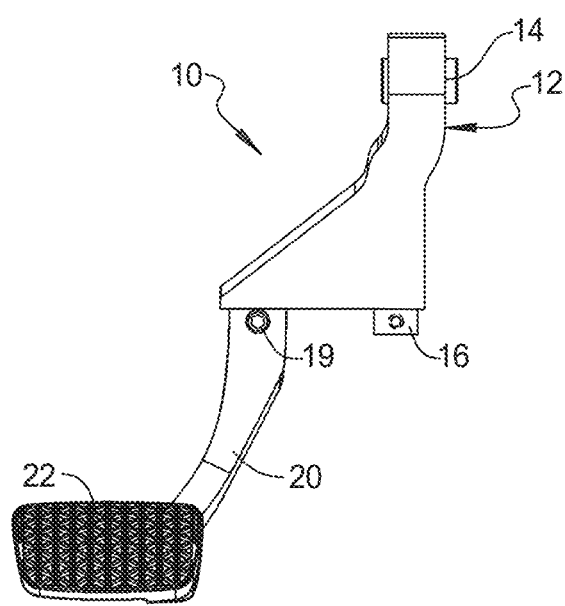
FIG. 2 is a perspective view of the two level brake pedal assembly with the brake pedal in a second position if preferred by a driver.

With reference to FIGS. 1 and 2, an adjustable brake pedal assembly 10 will be described. The adjustable brake pedal assembly 10 includes a dual lever 12 having an upper pivot mount portion 14 and a right side pedal mount portion 16 and a laterally spaced left side pedal mount portion 18. The upper pivot mount portion 14 is configured to be pivotally mounted to a vehicle structure and connected to a vehicle brake system as is known in the art. A pedal arm 20 is adapted to be alternatively mounted to either of the right side pedal mount portion 16 or the left side pedal mount portion 18. A foot pedal 22 is disposed at an end of the pedal arm 20.

The dual lever 12 and the pedal arm 20 are made from metal. The pedal arm 20 is mounted to either of the pair of laterally spaced lower pedal mount portions 16, 18 by one or more threaded fasteners 19. In a first right side position (shown in FIG. 1. On the right side pedal mount portion 16, the foot pedal 22 is mounted for "normal" use by a right footed driver. In a second left side position (shown in FIG. 2) on the left side pedal mount portion 18, the foot pedal 22 is mounted for use by a left footed driver. The right side pedal mount portion 16 and the left side pedal mount 18 are equally spaced from an axis of rotation of the upper pivot mount portion 14 so that in either position, the foot pedal 22 is equal distance from the axis of rotation.

The location is divided into two stages to provide a more comfortable position for the disabled driving on the left foot. Due to the nature of the brake pedal, it is pressed with strong force in an emergency, so, the rigid pedal design is required and the two level brake pedal is possible to move more to the left while maintaining a strong structural design. In order to satisfy the footrest regulation, a 50 mm spacing with the footrest must be maintained. The two level brake pedal is available to the left foot driver with a degree of freedom in the existing position and further to the left.

Figure 3:
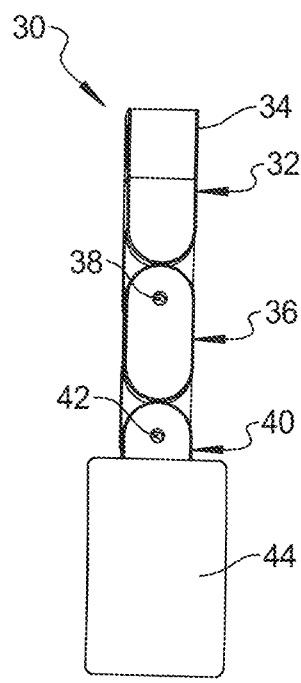
FIG. 3 is a front plan view of an adjustable accelerator pedal assembly in a first position.
Figure 4:
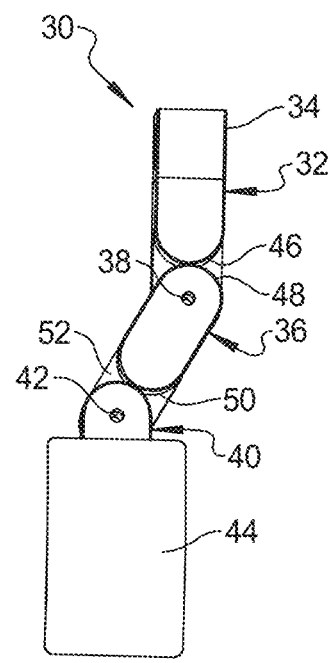
FIG. 4 is a front plan view of the adjustable accelerator pedal assembly in a second position if preferred by the driver.

With reference to FIGS. 3 and 4, an adjustable accelerator pedal assembly 30 will be described. The adjustable accelerator pedal assembly 30 includes an upper lever arm 32 having an upper pivot mount portion 34. An intermediate link 36 includes an upper end that is pivotally mounted to the upper lever arm 32 by a first pivot joint 38. A pedal arm 40 includes an upper end mounted to a lower end of the intermediate link 36 by a second pivot joint 42 and including a foot pedal 44 at a distal end. A first gear segment 46 is mounted to the upper lever arm 32. The intermediate link 36 includes an upper gear segment 48 that is in meshing engagement with the first gear segment 46. A lower gear segment 50 on the intermediate link 36 is in meshing engagement with a second gear segment 52 mounted to the pedal arm 40. The upper gear segment 48 is rotatable about the first pivot joint 38. The second gear segment 52 is rotatable about the second pivot joint 42. The first and second pivot joints 38, 42 are parallel to one another.

Figure 5:
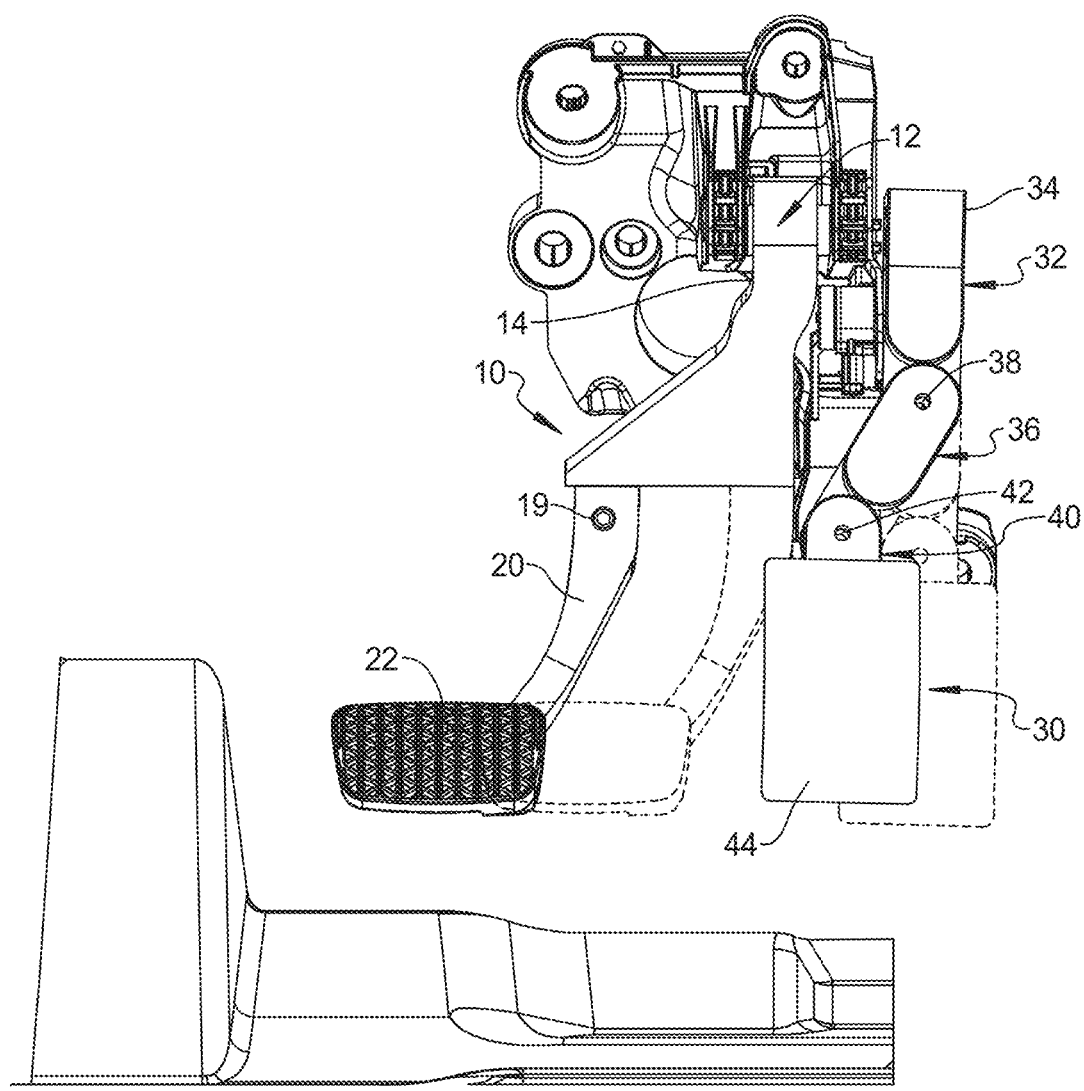
FIG. 5 is a perspective view of the adjustable pedal system illustrating the alternative positions of the brake pedal and accelerator pedal thereof.

A lateral position of the foot pedal 44 is adjustable relative to the upper lever arm 32 by pivoting of the first pivot joint 38 and the second pivot joint 42. With reference to FIG. 5, the adjustable pedal system can be applied to the brake and accelerator pedals 10, 30. For the brake pedal assembly 10, it is possible to a position of two levels including a "normal" or traditional use position and a position moved to the left for a left footed driver. According to regulations, the brake pedal assembly 10 is required to be 50 mm from the footrest. For the accelerator pedal 30, the gear type joints 38, 42 are used to adjust the position of the foot pedal 44. Bolts can be used to fasten the joints 38, 42 in place. The first joint 38 of the two joint structure allows the pedal 44 to move in the desired direction and the second joint 42 allows the pedal to move the position of the foot so that it can be operated.

In order for disabled people who need to use their left feet to drive, a special device must be installed on the left. If so, there is a risk of sudden unintended acceleration if the changed pedal position is unfamiliar. In addition, it is possible to adjust the position of the driver who is driving on the right foot and has difficulty driving in the existing pedal position due to his physical structure, so they can drive comfortably. Since everyone's body structure is different, the original pedal position may be inconvenient. The device of the present disclosure can provide convenience by adjusting the pedal to a convenient position not only for a disabled driver on the left foot, but also for those with driving discomfort in the existing pedal position.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. An adjustable brake pedal assembly, comprising:
   a dual lever having an upper pivot mount portion and a pair of laterally spaced protruding lower pedal mount portions;
   a pedal arm adapted to be selectively mounted to either of the pair of laterally spaced protruding lower pedal mount portions; and
   a foot pedal mounted at an end of the pedal arm.

2. The adjustable brake pedal assembly according to claim 1, wherein the pedal arm is mounted to either of the pair of laterally spaced protruding lower pedal mount portions by a threaded fastener.

3. The adjustable brake pedal assembly according to claim 1, wherein the pair of laterally spaced protruding lower pedal mount portions are equally spaced from an axis of rotation of the upper pivot mount portion.

4. The adjustable brake pedal assembly according to claim 1, wherein the dual lever and the pedal arm are made from metal.

5. An adjustable accelerator pedal assembly, comprising:
   an upper lever arm having an upper pivot mount portion;
   an intermediate link having an upper end pivotally mounted to the upper lever arm by a first pivot joint;

a pedal arm having an upper end mounted to a lower end of the intermediate link by a second pivot joint and including a foot pedal at a distal end;

wherein the adjustable accelerator pedal assembly moves in a first directional plane;

further comprising the intermediate link having a first pivot joint axis of rotation and a second pivot joint axis of rotation parallel to the first directional plane;

wherein a lateral position of the foot pedal is adjustable relative to the upper lever arm by pivoting of the first pivot joint and the second pivot joint.

6. The adjustable accelerator pedal assembly according to claim 5, further comprising a first gear segment mounted to the upper lever arm.

7. The adjustable accelerator pedal assembly according to claim 6, wherein the intermediate link includes an upper gear segment in meshing engagement with the first gear segment and a lower gear segment.

8. The adjustable accelerator pedal assembly according to claim 7, further comprising a second gear segment mounted to the pedal arm and engaged with the lower gear segment of the intermediate link.

9. The adjustable accelerator pedal assembly according to claim 8, wherein the upper gear segment is rotatable about the first pivot joint.

10. The adjustable accelerator pedal assembly according to claim 9, wherein the second gear segment is rotatable about the second pivot joint.

11. The adjustable accelerator pedal assembly according to claim 10, wherein the first pivot joint is parallel to the second pivot joint.

12. An adjustable pedal system for a vehicle, comprising:
an adjustable brake pedal assembly mounted adjacent to adjustable accelerator assembly and including a dual lever having an upper pivot mount portion and a pair of laterally spaced protruding lower pedal mount portions, a pedal arm adapted to be selectively mounted to either of the pair of laterally spaced protruding lower pedal mount portions, a foot pedal mounted at an end of the pedal arm; and an adjustable accelerator pedal assembly including an upper lever arm having an upper pivot mount portion, an intermediate link having an upper end pivotally mounted to the upper lever arm by a first pivot joint and a pedal arm having an upper end mounted to a lower end of the intermediate link by a second pivot joint and including a foot pedal at a distal end.

13. The adjustable accelerator pedal assembly according to claim 12, further comprising a first gear segment mounted to the upper lever arm.

14. The adjustable accelerator pedal assembly according to claim 13, wherein the intermediate link includes an upper gear segment in meshing engagement with the first gear segment and a lower gear segment.

15. The adjustable accelerator pedal assembly according to claim 14, further comprising a second gear segment mounted to the pedal arm and engaged with the lower gear segment of the intermediate link.

16. The adjustable accelerator pedal assembly according to claim 15, wherein the upper gear segment is rotatable about the first pivot joint.

17. The adjustable accelerator pedal assembly according to claim 16, wherein the second gear segment is rotatable about the second pivot joint.

18. The adjustable accelerator pedal assembly according to claim 17, wherein the first pivot joint is parallel to the second pivot joint.

19. The adjustable accelerator pedal assembly according to claim 15, wherein a lateral position of the foot pedal is adjustable relative to the upper lever arm by pivoting of the first pivot joint and the second pivot joint.

* * * * *